United States Patent
Bengtsson et al.

(10) Patent No.: US 9,578,464 B2
(45) Date of Patent: Feb. 21, 2017

(54) DETERMINING LOCATION OF A DEVICE IN A MIMO NETWORK USING MULTIPATH COMPONENT EVALUATION

(71) Applicant: Sony Corporation, Tokyo (JP)

(72) Inventors: Erik Bengtsson, Eslöv (SE); Peter C. Karlsson, Lund (SE); Magnus Persson, Lund (SE)

(73) Assignees: Sony Corporation, Tokyo (JP); Sony Mobile Communications Inc., Tokyo (JP)

(*) Notice: Subject to any disclaimer, the term of this patent is extended or adjusted under 35 U.S.C. 154(b) by 0 days.

(21) Appl. No.: 14/695,768

(22) Filed: Apr. 24, 2015

(65) Prior Publication Data

US 2016/0277898 A1 Sep. 22, 2016

Related U.S. Application Data

(63) Continuation of application No. PCT/EP2015/055643, filed on Mar. 18, 2015.

(51) Int. Cl.
 *H04W 4/02* (2009.01)
 *H04B 7/04* (2006.01)

(52) U.S. Cl.
 CPC ........... *H04W 4/028* (2013.01); *H04B 7/0413* (2013.01)

(58) Field of Classification Search
 CPC .............................. H04W 4/028; H04B 7/0413
 See application file for complete search history.

(56) References Cited

U.S. PATENT DOCUMENTS

| 2008/0032709 A1* | 2/2008 | Guvenc | G01S 5/0215 455/456.2 |
|---|---|---|---|
| 2012/0052835 A1 | 3/2012 | Bull et al. | |
| 2013/0172007 A1 | 7/2013 | Wax et al. | |

FOREIGN PATENT DOCUMENTS

WO 2010069610 A1 6/2010

OTHER PUBLICATIONS

"3rd Generation Partnership Project; Technical Specification Group Radio Access Network; Evolved Universal Terrestrial Radio Access Network (E-UTRAN); Stage 2 functional specification of User Equipment (UE) positioning in E-UTRAN (Release 11)", 3GPP Standard; 3GPP TS 36.305, 3rd Generation Partnership Project (3GPP), Mobile Competence Centre ; 650, Route Des Lucioles ; F-06921 Sophia-Antipolis Cedex France, vol. RAN WG2, No. V11.1.0, Sep. 21, 2012, pp. 1-58, XP050649828.

International Search Report and Written Opinion; Oct. 29, 2015; issued in International Patent Application No. PCT/EP2015/055643.

* cited by examiner

*Primary Examiner* — Kashif Siddiqui
(74) *Attorney, Agent, or Firm* — James C. Edwards; Moore & Van Allen PLLC

(57) ABSTRACT

The invention is directed to systems, methods and computer program products for determining a location of a device on a massive MIMO (multiple-input multiple-output) network. The device transmits a signal comprising several multipath components (MPCs) either omnidirectionally or with limited directivity. The method comprising identifying, by a base station, that receives MPCs, an MPC with a figure of merit, based on a time delay and an angular spread, better than that of other MPCs; determining, by the base station, an angle of arrival (AoA) of the MPC is different from the AoAs of the other MPCs; and determining, by the base station, a location of the device based on the time delay and the AoA.

18 Claims, 5 Drawing Sheets

DETERMINING LOCATION OF A DEVICE IN A MIMO NETWORK USING MULTIPATH COMPONENT EVALUATION

BACKGROUND

In today's cellular and wireless connectivity systems, a user equipment (UE) is capable of measuring signals (e.g., radio frequency (RF) signals) from multiple base stations (BSs) or access points (APs) and based on the relative phases of the measured signals, calculate the UE's position by means of triangulation. In a massive multiple input multiple output (MIMO) system, this will not be possible for two reasons. A UE will not be able to listen to a BS to which it is not connected and the phase of a signal is re-defined for every frame; hence there is no absolute phase. Therefore, the UE is not capable of determining its position based on the RF signal.

BRIEF SUMMARY

Embodiments of the invention are directed to systems, methods and computer program products for determining a location of a device on a massive MIMO (multiple-input multiple-output) network, the device transmitting a signal comprising several multipath components (MPCs) transmitted either omnidirectionally or with limited directivity. A method for determining a location of a device comprises identifying, by a base station, that receives MPCs, an MPC with a figure of merit, based on a time delay and an angular spread, better than that of other MPCs; determining, by the base station, an angle of arrival (AoA) of the MPC is different from the AoAs of the other MPCs; determining, by the base station, a location of the device based on the time delay and the AoA.

In some embodiments, an angular spread associated with the MPC is less than a predetermined threshold needed for determining the MPC is a line-of-sight MPC.

In some embodiments, the MPC is associated with the lowest angular spread compared to the other MPCs if the delay associated with the MPC and the other MPCs is less than a predetermined threshold.

In some embodiments, the location comprises a relative location with respect to the base station, and wherein an absolute location of the device is determined based on the relative location and an orientation of the device.

In some embodiments, the method further comprises determining, by the base station, a relative location of the device with respect to the base station based on determining a change per unit time of AoAs and time delays of the several MPCs.

In some embodiments, the location of the device is determined even if an obstruction in a path between the device and the base station affects an amplitude of the MPC.

In some embodiments, the signal comprises a pilot signal.

In some embodiments, the location of the device is determined every predetermined number of frames.

In some embodiments, the device is located in a closed area.

In some embodiments, the device is located in an open area.

In some embodiments, the location of the device is based on previously known locations of the device calculated by a positioning system such as at least one of a Global Navigation Satellite System (GNSS), a sensor, or a radio based system.

In some embodiments, determining the location of the device is based on past or present movement of the device, the movement comprises at least one of a speed, a direction, or an acceleration.

In some embodiments, determining the location of the device is based on geographical information about surroundings of the device.

In some embodiments, the method further comprises transmitting, by the base station and to the device, the location of the device.

In some embodiments, an apparatus (e.g., located at a base station) is provided for determining a location of a device. The apparatus comprises: a memory; a processor; and a module stored in the memory, executable by the processor, and configured to identify, by a base station, that receives MPCs transmitted either omnidirectionally or with limited directivity, an MPC with a figure of merit, based on a time delay and an angular spread, better than that of other MPCs, the base station comprising the apparatus; determine, by the base station, an angle of arrival (AoA) of the MPC is different from the AoAs of the other MPCs; and determine, by the base station, a location of the device based on the time delay and the AoA.

In some embodiments, a computer program product is provided for determining a location of a device. The computer program product comprises a non-transitory computer-readable medium comprising a set of codes for causing a computer to identify, by a base station, that receives MPCs transmitted either omnidirectionally or with limited directivity, an MPC with a figure of merit, based on a time delay and an angular spread, better than that of other MPCs, the base station comprising the apparatus; determine, by the base station, an angle of arrival (AoA) of the MPC is different from the AoAs of the other MPCs; and determine, by the base station, a location of the device based on the time delay and the AoA.

BRIEF DESCRIPTION OF THE DRAWINGS

Figure 1:
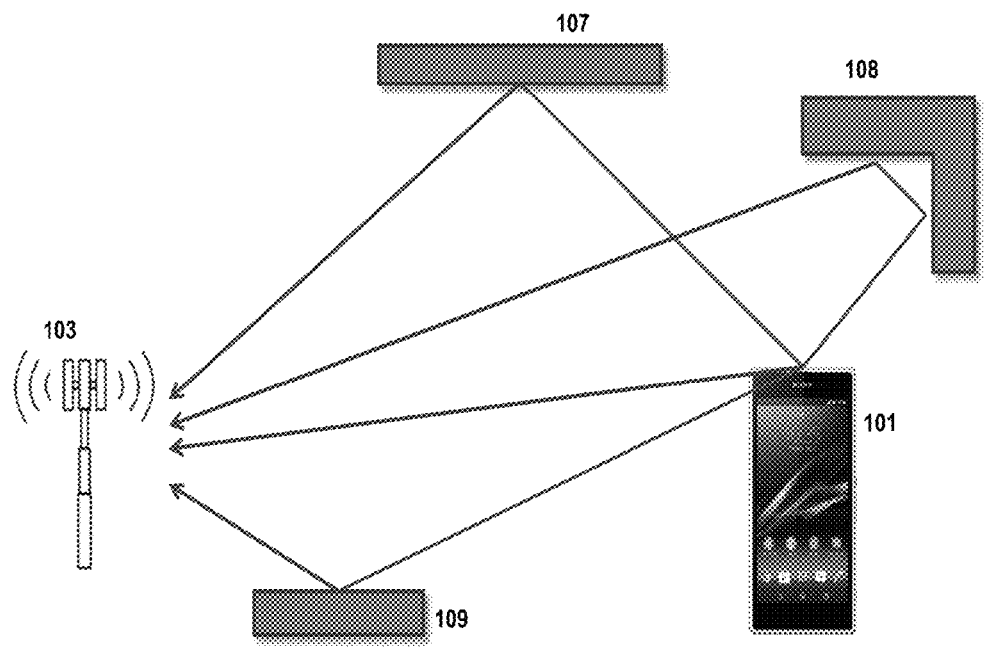
Figure 2:
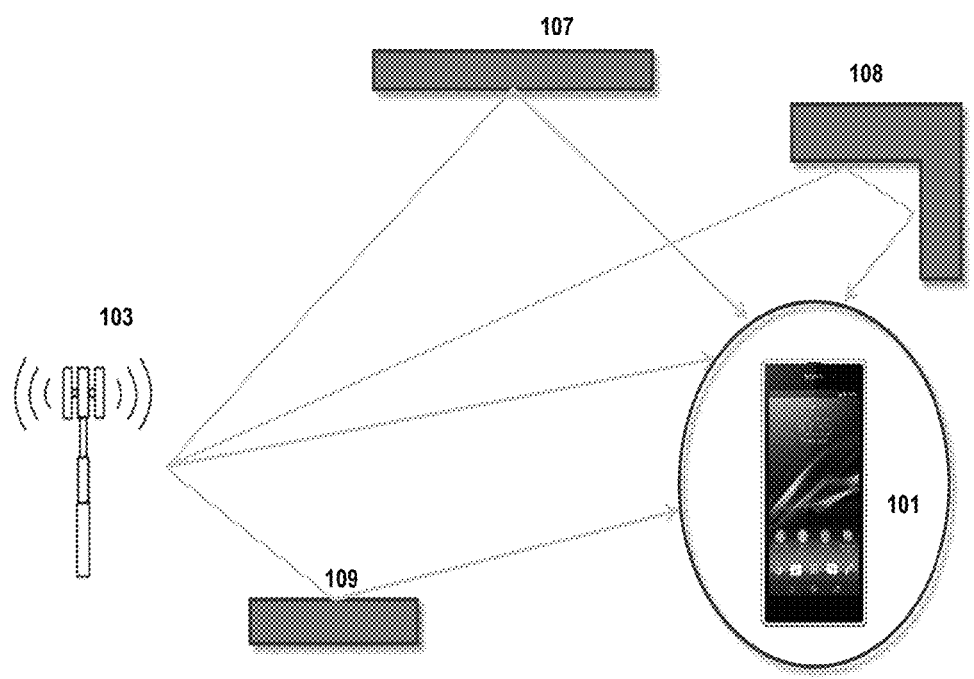
Figure 3:
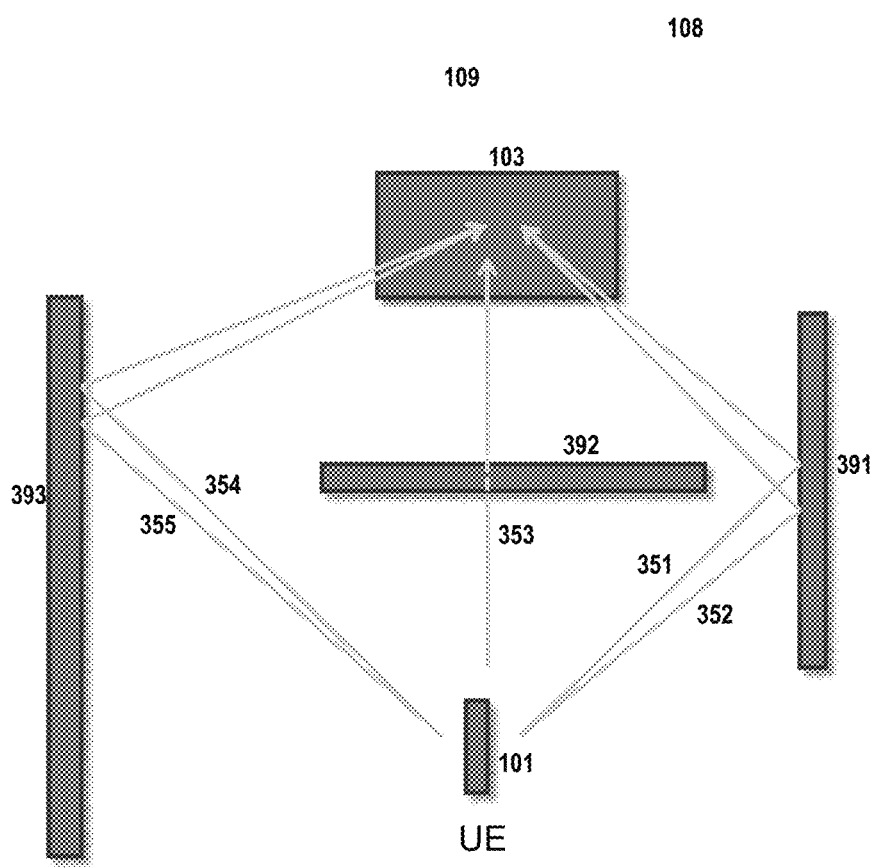
Figure 4:
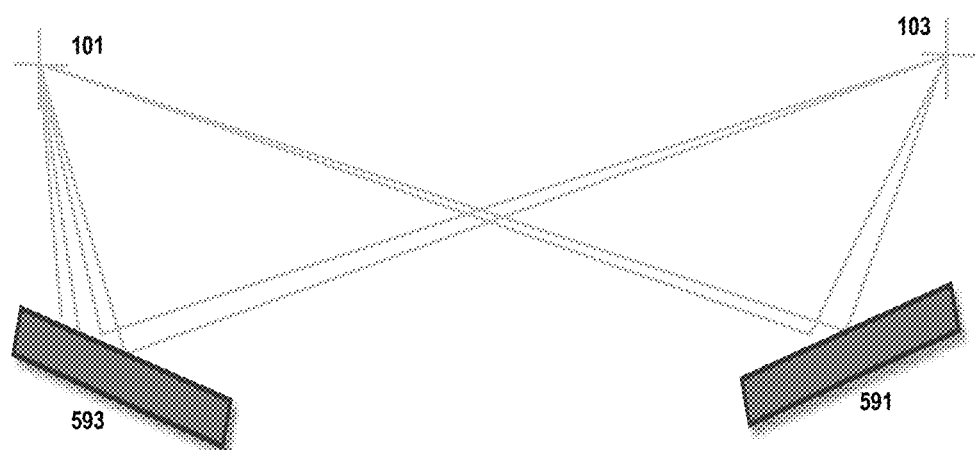
Figure 5:
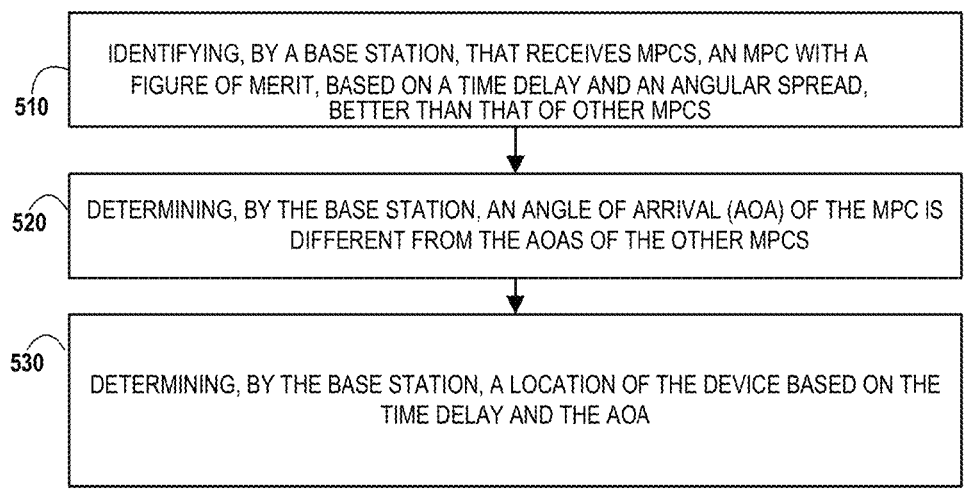

Having thus described embodiments of the invention in general terms, reference will now be made to the accompanying drawings, where:

FIG. 1 is an exemplary MIMO network, in accordance with embodiments of the present invention;

FIG. 2 is an exemplary MIMO network, in accordance with embodiments of the present invention;

FIG. 3 is an exemplary MIMO network, in accordance with embodiments of the present invention;

FIG. 4 is an exemplary MIMO network, in accordance with embodiments of the present invention;

FIG. 5 is an exemplary method for determining the location of the device, in accordance with embodiments of the present invention.

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Massive MIMO systems are a popular candidate for future 3GPP ($3^{rd}$ Generation Partnership Project) releases. "Massive" MIMO refers to using multiple antennas (e.g., equal to or greater than a threshold number of antennas) in a MIMO system. An order associated with a MIMO system refers to a number of antennas associated with the MIMO system. The MIMO system includes at least one user equipment ("UE") and at least one base station ("BS"). As used herein, a UE may also be referred to as a device, system, mobile device, apparatus, etc.

When moving to a massive MIMO network, it is difficult to determine the location of a device. Referring now to FIG. 1, FIG. 1 presents an exemplary massive MIMO network. In massive MIMO, the device 101 sends out a pilot (or pilot signal) at specific time intervals, approximately every millisecond, that is received at the base station 103. In some instances, the pilot signals transmitted from the device 101 may reflect off of a reflector 107, 108, or 109 prior to being received at the base station 103. At the base station 103, the angles of the incoming pilot signals are identified and the time delay for each pilot signal is calculated. As used herein, a pilot signal may also be referred to as just a signal or a signal path. The measured information may be used to determine the location of the device.

Referring now to FIG. 2, FIG. 2 presents another exemplary massive MIMO network. The base station 103 that receives the signals in FIG. 1, transmits signals back in substantially the same directions with suitable time delays making the signals reach the device at substantially the same time from multiple paths. Hence, no phase difference between the signals can be identified when the device is moving as the base station compensates for any possible phase difference between the signals. The signal strength of a signal can also vary heavily based on the available reflections and is no longer as tightly related to the distance from the base station and the output power of the device such that the signal strength can be used for estimating the location of a device (e.g., the distance from the base station to the device). Also, the BS may individually steer the amplitude of each MPC. What is needed is a novel method to determine the location of the device. The present invention provides a novel method of determining the location of the device. The method works where the device is indoors (e.g., a closed environment not exposed to the outside such as inside a building), or outdoors (e.g., an open environment such as out on a field). The device location method also enables the device to comply with potential future emergency call requirements (i.e., the ability to accurately position a device during an emergency call).

A base station or access point in a massive MIMO system has a large number of antennas, and the base station is capable of not only detecting the signal power and delay for individual multipath components (MPCs) of a signal transmitted from the device, but also the angle of arrival (AoA) of an MPC and angular spread. The signal transmitted from the device is device to the base station is made up of multiple MPCs. Each MPC is associated with a unique time delay, an angle of arrival at the base station, and amplitude. The MPC resolution at the BS is determined based on a combination of the number of antenna elements in the antenna array of the base station and the operational radio frequency bandwidth (RF BW) associated with the antenna array. Each time an MPC is reflected off of a reflector, there is an increase in angular spread (AS) of the MPCs. As used herein, a reflector may refer to an obstruction between the device and the base station. Angular spread refers to the spread of angles of arrival of the MPCs at the base station. The present invention is directed to identifying the MPC with the shortest delay (e.g., with respect to a base time) and lowest angular spread, and using this information for determining, by the base station, the angle from the antenna at which the device is located the location of the device. When the angle information is combined with distance of the device from one or more BSs, the location of the device can be determined. Information associated with the location of the device may be fed back to the device from the base station so that the device can use the location for any location based services (e.g., an emergency call application).

Referring now to FIG. 3, FIG. 3 presents an exemplary MIMO network. The base station 103 comprises an antenna array comprising at least a threshold number of antennas. The device 101 transmits a signal comprising MPCs. MPCs 351 and 352 are reflected by reflector 391 on the path from the device to the base station. MPC 353 is the direct path component as described herein. While MPC 353 is obstructed by obstruction 392, the obstruction 392 affects the amplitude of MPC 353, but does not affect the phase and AoA of MPC 353, or AS. MPCs 354 and 355 are reflected by reflector 393 on the path from the device to the base station. As used herein, in some embodiments, a reflector and an obstruction may be equivalent, and may refer to a device that receives an MPC or a signal from the device and diverts the MPC or the signal towards the base station (such as a wall).

The method described herein uses the AoA and AS information to determine the location of a device. The method identifies the MPC (e.g., MPC 353 in FIG. 3) with the shortest delay since this MPC provides the shortest path between the device and the base station. The MPC that provides the shortest path may also be referred to as a direct path component. Additionally, the AS is evaluated to determine whether the MPC is a reflection component or a direct path component. Even if the MPC is obstructed by an obstruction in the path from the device to the base station, the phase (or time delay) and the AoA of the MPC are not affected by the obstruction, but the amplitude of the MPC is affected by the obstruction. Since the amplitude of the MPC is affected, the direct path component may not be the strongest MPC as determined by the base station.

Referring now to FIG. 4, FIG. 4 presents an exemplary MIMO network. The closer a reflection occurs to the base station 103, the larger is the error in AoA as the AS becomes larger closer to the base station 103. The AS is wider at reflector 591 compared to the AS at reflector 593. It has been determined that a narrow AS provides a better metric for determining the location of the device. Therefore, the AS at reflector 591 is used rather than the AS at reflector 593 as a metric in determining the direction to the location of the device 101, and using delay information, the location of the device 101. Once the direct path component is identified by the base station, the actual delay or phase and AoA of the MPC is used by the base station to determine the location of the device 101. In some embodiments, the AoA comprises both a vertical component with respect to a vertical axis and a horizontal component with respect to a horizontal axis.

The method described herein may be a statistical approach that determines the absolute position (i.e., not relative with respect to a base position or the base station) of the device in a three-dimensional space. The method can be combined with other methods that determine the relative movement of the device with respect to the base station by evaluating how the phase or time delay and AoA of the different MPCs change. In some embodiments, the location determining or positioning procedure described herein can be combined with other information such as the history of device location (e.g., over a period of time, at a particular during the day, etc.) to determine the likelihood of the device being in a particular location. The speed at which the device is moving may also be determined (e.g., by the base station or by the device and transmitted to the base station) and may be used as an additional factor in determining the location of the device.

Referring now to FIG. 5, FIG. 5 presents an exemplary method according to embodiments of the invention. At block 510, the method comprises identifying, by a base station, that receives MPCs, an MPC with a figure of merit, based on a time delay and an angular spread, better than that of other MPCs. At block 520, the method comprises determining, by the base station, an AoA of the MPC is different from the AoAs of the other MPCs. At block 530, the method comprises determining, by the base station, a location of the device based on the time delay and the AoA. As used herein, a figure of merit refers to a quantity determined based on a computing involving at least one of the time delay and the angular spread. Other quantities or measurements may also be used in determining the figure of merit.

In some embodiments, an angular spread associated with the MPC is less than a predetermined threshold needed for determining the MPC is a line-of-sight MPC. The MPC is associated with the lowest angular spread compared to the other MPCs if the delay associated with the MPC and the other MPCs is less than a predetermined threshold. In some embodiments, the location comprises a relative location with respect to the base station, and wherein an absolute location of the device is determined based on the relative location and an orientation of the device. In some embodiments, the method further comprises determining, by the base station, a relative location of the device with respect to the base station based on determining a change per unit time of AoAs and time delays of the several MPCs.

In some embodiments, the location of the device is determined even if an obstruction in a path between the device and the base station affects an amplitude of the MPC. In some embodiments, the signal comprises a pilot signal. In some embodiments, the location of the device is determined every predetermined number of frames.

In some embodiments, the device is located in a closed area. In some embodiments, the device is located in an open area. In some embodiments, the location of the device is based on previously known locations of the device calculated by a positioning system such as at least one of a Global Navigation Satellite System (GNSS), a sensor, or a radio based system. In some embodiments, determining the location of the device is based on past or present movement of the device, the movement comprises at least one of a speed, a direction, or an acceleration. In some embodiments, determining the location of the device is based on geographical information about surroundings of the device. In some embodiments, the method further comprises transmitting, by the base station and to the device, the location of the device.

The invention is not limited to any particular types of devices for the device or the base station. Examples of devices include mobile phones or other mobile computing devices, mobile televisions, laptop computers, smart screens, tablet computers or tablets, portable desktop computers, e-readers, scanners, portable media devices, gaming devices, cameras or other image-capturing devices, headgear, eyewear, watches, bands (e.g., wristbands) or other wearable devices, or other portable computing or non-computing devices. The base station may be associated with any protocol, and is not limited to any particular protocol (e.g., 3GPP, IEEE, WiFi, etc.).

Each device and/or base station comprises a communication interface, a processor, a memory, and a module stored in the memory, executable by the processor, and configured to perform the various processes described herein. Each communication interface described herein enables communication with other systems. For example, the communication interface comprises at least one antenna.

Each processor described herein generally includes circuitry for implementing audio, visual, and/or logic functions. For example, the processor may include a digital signal processor device, a microprocessor device, and various analog-to-digital converters, digital-to-analog converters, and other support circuits. Control and signal processing functions of the system in which the processor resides may be allocated between these devices according to their respective capabilities. The processor may also include functionality to operate one or more software programs based at least partially on computer-executable program code portions thereof, which may be stored, for example, in a memory.

Each memory may include any computer-readable medium. For example, memory may include volatile memory, such as volatile random access memory ("RAM") having a cache area for the temporary storage of data. Memory may also include non-volatile memory, which may be embedded and/or may be removable. The non-volatile memory may additionally or alternatively include an EEPROM, flash memory, and/or the like. The memory may store any one or more of pieces of information and data used by the system in which it resides to implement the functions of that system.

The various features described with respect to any embodiments described herein are applicable to any of the other embodiments described herein. As used herein, the terms data and information may be used interchangeably. Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures, etc.), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory ("RAM"), a read-only memory ("ROM"), an erasable programmable read-only memory ("EPROM" or "Flash memory"), a compact disc read-only memory ("CD-ROM"), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable information processing apparatus in order to produce a particular machine, such that the one or more computer-executable program code portions, which execute via the processor of the computer and/or other programmable information processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory, etc.) that can direct, instruct, and/or cause a computer and/or other programmable information processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable information processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A method for determining a location of a device on a massive MIMO (multiple-input multiple-output) network, the device transmitting a signal comprising several multipath components (MPCs) transmitted either omnidirectionally or with limited directivity, the method comprising:
   identifying, by a base station, that receives MPCs, an MPC with a figure of merit, based on a time delay and an angular spread, better than that of other MPCs;
   determining, by the base station, an angle of arrival (AoA) of the MPC different from the AoAs of the other MPCs; and
   determining, by the base station, a location of the device based on the time delay and the AoA.

2. The method of claim 1, wherein an angular spread associated with the MPC is less than a predetermined threshold needed for determining the MPC is a line-of-sight MPC.

3. The method of claim 2, wherein the MPC is associated with the lowest angular spread compared to the other MPCs if the time delay associated with the MPC and the other MPCs is less than a predetermined threshold.

4. The method of claim 1, wherein the location comprises a relative location with respect to the base station, and wherein an absolute location of the device is determined based on the relative location and an orientation of the device.

5. The method of claim 1, further comprising determining, by the base station, a relative location of the device with respect to the base station based on determining a change per unit time of AoAs and time delays of the several MPCs.

6. The method of claim 1, wherein the signal comprises a pilot signal.

7. The method of claim 1, wherein the location of the device is determined every predetermined number of transmission packets or frames.

8. The method of claim 1, wherein the device is located in a closed area.

9. The method of claim 1, wherein the device is located in an open area.

10. The method of claim 1, wherein determining the location of the device is based on previously known locations of the device.

11. The method of claim 1, wherein determining the location of the device is based on previously known locations of the device calculated by a positioning system such as at least one of a Global Navigation Satellite System (GNSS), a sensor, or a radio based system.

12. The method of claim 1, wherein determining the location of the device is based on past or present movement of the device, the movement comprises at least one of a speed, a direction, or an acceleration.

13. The method of claim 1, wherein determining the location of the device is based on geographical information about surroundings of the device.

14. The method of claim 1, further comprising transmitting, by the base station and to the device, the location of the device.

15. An apparatus for determining a location of a device on a massive MIMO (multiple-input multiple-output) network, the device transmitting a signal comprising several multipath components (MPCs) transmitted either omnidirectionally or with limited directivity, the apparatus comprising:
   a memory;
   a processor; and
   a module stored in the memory, executable by the processor, and configured to:
      identify, by a base station, that receives MPCs, an MPC with a figure of merit, based on a time delay and an angular spread, better than that of other MPCs, the base station comprising the apparatus;
      determine, by the base station, an angle of arrival (AoA) of the MPC different from the AoAs of the other MPCs; and
      determine, by the base station, a location of the device based on the time delay and the AoA.

16. The apparatus of claim 15, wherein the module is further configured to transmit, by the base station and to the device, the location of the device.

17. A computer program product for determining a location of a device on a massive MIMO (multiple-input multiple-output) network, the device transmitting a signal comprising several multipath components (MPCs) transmitted either omnidirectionally or with limited directivity, the computer program product comprising:
   a non-transitory computer-readable medium comprising a set of codes for causing a computer to:
      identify, by a base station, that receives MPCs, an MPC with a figure of merit, based on a time delay and an angular spread, better than that of other MPCs the base station comprising the apparatus;
      determine, by the base station, an angle of arrival (AoA) of the MPC different from the AoAs of the other MPCs; and
      determine, by the base station, a location of the device based on the time delay and the AoA.

18. The computer program product of claim 17, wherein the set of codes further causes a computer to transmit, by the base station and to the device, the location of the device.

* * * * *